US012776923B2

(12) United States Patent
Gremaud

(10) Patent No.: US 12,776,923 B2
(45) Date of Patent: Oct. 27, 2026

(54) DEPLOYMENT OF DIGITAL SECURITY CREDENTIALS FOR JUST-IN-TIME PROVISIONING OF NETWORKED DEVICES

(71) Applicant: NAGRAVISION SÀRL, Cheseaux-sur-Lausanne (CH)

(72) Inventor: Fabien Gremaud, Cheseaux-sur-Lausanne (CH)

(73) Assignee: NAGRAVISION SÀRL, Cheseaux-sur-Lausanne (CH)

( * ) Notice: Subject to any disclaimer, the term of this patent is extended or adjusted under 35 U.S.C. 154(b) by 76 days.

(21) Appl. No.: 18/900,406

(22) Filed: Sep. 27, 2024

(65) Prior Publication Data

US 2025/0112791 A1 Apr. 3, 2025

(30) Foreign Application Priority Data

Sep. 29, 2023 (EP) .................................... 23201064

(51) Int. Cl.
*H04L 29/06* (2006.01)
*H04L 9/08* (2006.01)
*H04L 9/32* (2006.01)

(52) U.S. Cl.
CPC .......... *H04L 9/3268* (2013.01); *H04L 9/0825* (2013.01); *H04L 9/3247* (2013.01)

(58) Field of Classification Search
CPC . H04L 9/3247; H04L 63/0823; H04L 9/0825; H04L 9/3268; H04L 9/3263; H04W 12/35
See application file for complete search history.

(56) References Cited

U.S. PATENT DOCUMENTS

| | | | | |
|---|---|---|---|---|
| 2021/0352051 | A1* | 11/2021 | Schmitt | H04L 9/006 |
| 2022/0159461 | A1* | 5/2022 | Maass | H04L 9/0894 |
| 2022/0224549 | A1 | 7/2022 | Pala et al. | |
| 2023/0275888 | A1* | 8/2023 | Zeng | G06F 21/44 713/156 |

OTHER PUBLICATIONS

Extended European Search Report issued on Mar. 14, 2024. in European Patent Application No. 23201064.5. filed on Sep. 29, 2023, 8 pages.

* cited by examiner

*Primary Examiner* — Tri M Tran
(74) *Attorney, Agent, or Firm* — Maier & Maier, PLLC

(57) ABSTRACT

A method, device, and computer-readable medium for provisioning a networked device with digital security credentials, including receiving a first digital certificate of a secure component associated with the networked device; extracting a public key of from the first digital certificate, the public key and a corresponding private key being stored in the secure component for asymmetric cryptography; receiving a product identifier and a vendor identifier associated with the secure component from a first user device; generating a second digital certificate based on the public key of the secure component, the product identifier, and the vendor identifier; and transmitting the second digital certificate to the networked device associated with the secure component, the networked device being configured to generate a device commissioning request based on the second digital certificate and the private key of the secure component.

17 Claims, 9 Drawing Sheets

DEPLOYMENT OF DIGITAL SECURITY CREDENTIALS FOR JUST-IN-TIME PROVISIONING OF NETWORKED DEVICES

CROSS-REFERENCE TO RELATED APPLICATION(S)

The present application claims priority to European Patent Application No. 23201064.5, which was filed on Sep. 29, 2023 and which is incorporated herein by reference in its entirety for all purposes.

BACKGROUND

Field of the Disclosure

The present disclosure relates to provisioning and commissioning of networked devices.

Description of the Related Art

Networked devices can be authenticated using digital security credentials that are assigned by a trusted authority. The digital security credentials can be generated using asymmetric cryptography.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment, the present disclosure is directed to a method for provisioning a networked device with digital security credentials, comprising receiving, by processing circuitry of a security server, a first digital certificate of a secure component associated with the networked device; extracting, by the processing circuitry of the security server, a public key of from the first digital certificate, the public key and a corresponding private key being stored in the secure component for asymmetric cryptography; receiving, by the processing circuitry of the security server, a product identifier and a vendor identifier associated with the secure component from a first user device; generating, by the processing circuitry of the security server, a second digital certificate based on the public key of the secure component, the product identifier, and the vendor identifier; and transmitting, by the processing circuitry of the security server, the second digital certificate to the networked device associated with the secure component, the networked device being configured to generate a device commissioning request based on the second digital certificate and the private key of the secure component.

In one embodiment, the present disclosure is directed to a device comprising processing circuitry configured to receive a first digital certificate of a secure component associated with a networked device; extract a public key from the first digital certificate, the public key and a corresponding private key being stored in the secure component for asymmetric cryptography; receive a product identifier and a vendor identifier associated with the secure component from a first user device; generate a second digital certificate based on the public key of the secure component, the product identifier, and the vendor identifier; and transmit the second digital certificate to the networked device associated with the secure component, the networked device being configured to generate a device commissioning request based on the second digital certificate and the private key of the secure component.

In one embodiment, the present disclosure is directed to a non-transitory computer-readable storage medium for storing computer-readable instructions that, when executed by a computer, cause the computer to perform a method, the method comprising: receiving a first digital certificate of a secure component associated with a networked device; extracting a public key from the first digital certificate, the public key and a corresponding private key being stored in the secure component for asymmetric cryptography; receiving a product identifier and a vendor identifier associated with the secure component from a first user device; generating a second digital certificate based on the public key of the secure component, the product identifier, and the vendor identifier; and transmitting the second digital certificate to the networked device, the networked device being configured to generate a device commissioning request based on the second digital certificate and the private key of the secure component.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
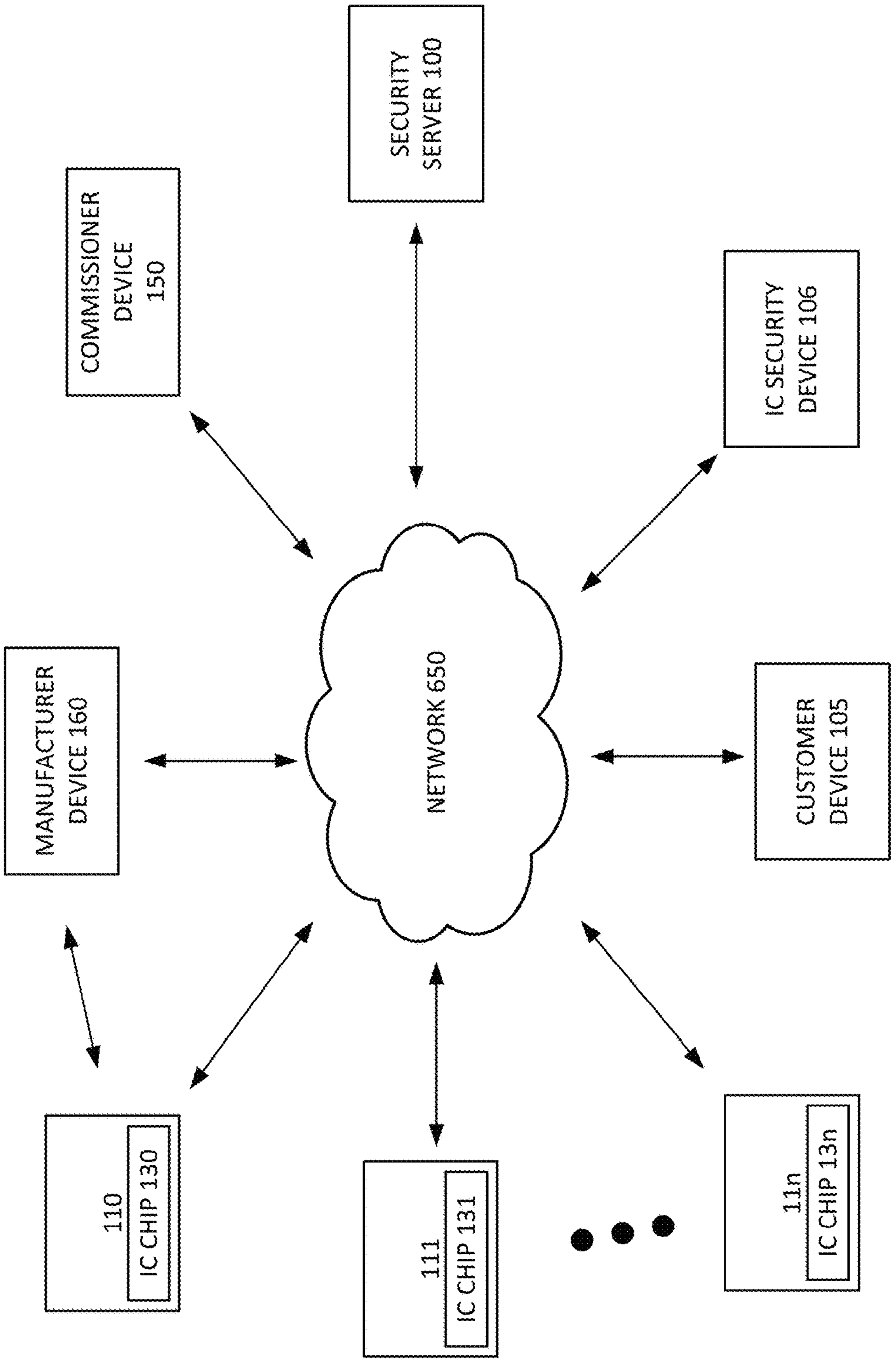
FIG. 1 is a schematic of a networked system for provisioning a networked device, according to an embodiment of the present disclosure.

The terms "a" or "an", as used herein, are defined as one or more than one. The term "plurality", as used herein, is defined as two or more than two. The term “another”, as used herein, is defined as at least a second or more. The terms “including” and/or “having”, as used herein, are defined as comprising (i.e., open language). Reference throughout this document to “one embodiment”, “certain embodiments”, “an embodiment”, “an implementation”, “an example” or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

In one embodiment, the present disclosure is related to systems and methods for provisioning and commissioning networked devices. The networked devices can include, for example, embedded systems such as Internet of things (IoT) devices that are configured to share data with a computing device (e.g., a server, a computer, a user device). The networked devices can include, but are not limited to, microcontrollers, sensor devices, appliances, and control devices. For example, a networked device can be a sensor device that is deployed to collect sensor data such as a temperature of a surrounding environment. The networked devices can be configured to be connected to a communications network, such as a public or private Internet network. The sensor device can transmit the temperature data to a server via a communication network. The server can process, store, and/or transmit the temperature data to determine a condition of the environment of the sensor device. The server can be located remotely, e.g., in a different location from the sensor device. The transmission of sensor data over the communication network can enable a more powerful computing device (the server) to process sensor data that is collected remotely by the sensor device. In one example, the sensor device can be one of a plurality of sensor devices configured to collect temperature data of the surrounding environment. The plurality of sensor devices can be part of a shared device network, wherein each device in the shared device network can transmit sensor data to the server. The distribution of the sensor devices can provide advantages in the frequency, type, and granularity of data collection, wherein the data from each sensor device can be aggregated and processed by the server.

A networked device can be configured to connect to a communication network and to securely transmit data to a designated central computing device (e.g., an IoT server) when the networked device is deployed in an environment. The configuration of the networked device can include provisioning the networked device, wherein the networked device is given a unique device identity that can be authenticated by the IoT server. Provisioning can further include registering the networked device and generating security credentials (e.g., digital certificates) for the networked device. When the networked device is deployed, an IoT server can verify the device identity of the networked device in order to allow data to be transmitted between the IoT server and the networked device. The IoT server can then add the networked device to the shared device network. The networked device can be provisioned during or after the device assembly process.

In one embodiment, the systems and methods described herein can be used for just-in-time provisioning of a networked device. Just-in-time provisioning can refer to generating security credentials for a networked device when the networked device connects to a communication network in the field after assembly. For example, a networked device can be deployed to an end user environment. A security server can generate and deploy security credentials to the networked device the first time that the networked device connects to a communication network in the end user environment. Just-in-time provisioning can be advantageous in that the security credentials for the networked device do not need to be generated until the networked device is ready for use. In addition, just-in-time provisioning can be performed in the field and can avoid cybersecurity vulnerabilities in manufacturing environments that can result in security credentials being intercepted during manufacturing or distribution of networked devices.

A networked device can include one or more integrated circuit (IC) chips, such as a microcontroller. A microcontroller can include a central processing unit (CPU), memory, and/or input/output (I/O) peripherals. In some instances, the IC chip can include origin security credentials that are generated and written to the IC chip during manufacturing. The chip is then integrated into a networked device during the device assembly process. In one embodiment, the origin security credentials of the IC chip can be generated by a security controller hardware module. The security controller hardware module can be integrated into the IC chip or a corresponding networked device. As a non-limiting example, the security controller hardware module can be a Trust M module. In one embodiment, the systems and methods of the present disclosure are directed towards provisioning the networked device using the origin security credentials of the IC chip. The provisioning of the networked device, as presented herein, can include using security credentials that are generated by more than one computing device in order to authenticate a networked device using secure provisioning techniques.

FIG. 1 is a schematic of a computing device (e.g., a security server) 100 in network communication with one or more networked devices 110, 111, **11*n* via a communication network 650, e.g., an Internet connection, Bluetooth, etc. The communication network 650 can include more than one communication network, e.g., more than one local area network (LAN). The one or more networked devices can be, for example, IoT sensors. Each networked device can include at least one IC chip 130, 131, 13*n*. The IC chip can be referred to herein as a secure component associated with a networked device. The secure component can be embedded in or coupled to the networked device or can be in communication (e.g., wired communication, network communication) with the networked device. In one embodiment, the secure component can be removably coupled to the networked device. In one embodiment, the security server 100 can be configured to generate security credentials and deploy the security credentials to each of the networked devices. In one embodiment, the security server 100 can be in communication with one or more devices 105, 106, 160. The devices can be, for example, a user device such as a computer or a mobile device or one or more servers. Each of the devices illustrated in FIG. 1 can include processing circuits/processing circuitry, the processing circuitry including one or more processors, controllers, programmed processing units (e.g., central processing units (CPUs)), integrated circuits, etc. Examples of processing circuits and components thereof are further described herein with reference to FIGS. 7-9. The processes and methods described herein can be executed by processing circuitry in the respective devices illustrated in FIG. 1**, e.g., by a CPU of a computing device.

The security server 100 can receive data from the devices 105, 106, 160, the data including instructions, security credentials, or identification data related to the one or more networked devices. In one embodiment, the devices can be associated with a manufacturer, a vendor, a purchaser, an administrator, or a security system of networked devices. For example, a first device 105 can be a customer device associated with an owner of networked devices 110, 111, 11*n*. The customer device 105 can transmit data to set up and take ownership of networked devices and request security credentials for the networked devices. For example, a customer device 105 can be used to transmit a request to initiate a process of assembling and/or provisioning the networked devices. A second device 106 can be an IC security device 106 associated with a manufacturer of IC chips 130, 131, 13*n* that are embedded in the networked devices 110. In one embodiment, the IC security device 106 can be associated with a chip security system and can generate and/or access origin security credentials of an IC chip. The IC security device 106 can transmit at least part of the origin security credentials to the customer device 105 and/or the security server 100. The customer device 105 and the IC security device 106 may or may not be in network communication with each other. In one embodiment, the device 160 can be a manufacturer device 160. The manufacturer device 160 can be associated with the manufacturing or assembly of networked devices using IC chips. In one embodiment, the manufacturer device 160 can receive a request for a number of networked devices from a customer device 150. The manufacturer device 160 can then receive, as an input, identification data or security credentials related to the networked devices that were requested by the customer device 150. In one embodiment, the manufacturer device 160 can be in network communication with the security server 100, the customer device 105, and/or the IC security device 106. In one embodiment, the manufacturer device 160 can transmit data to a networked device or receive data from the networked device.

The security server 100 can generate a set of security credentials based on the data received from the devices 105, 106, 160 and can then deploy the set of security credentials to the one or more networked devices. In one embodiment, the networked devices can be in network communication with a commissioner device 150, which can be a computing device such as a server or computer. The commissioner device 150 can access the security server 100 via a network to retrieve data including the set of security credentials associated with a networked device 110. The network can be the network 650 or a separate network. The commissioner device 150 can also provide data, such as commissioning data, to the networked device 110 to commission the networked devices 110 to a shared device network. In one embodiment, the networked devices 110, 111, 11*n* can be in communication with other devices via a wired connection in addition to or in place of the communication network 650.

A digital certificate is a non-limiting example of a security credential that can be used according to the present disclosure. A batch of digital certificates can be stored in one or more files used for device authentication, the one or more files including identifying information about the device that is issued the digital certificate. Digital certificates can be issued to a device by device (e.g., a server) hosting a public key infrastructure (PKI) system. The digital certificates can then be transmitted to other devices for secure identification. For example, a networked device can receive a digital certificate and can transmit the digital certificate to an IoT server. The IoT server can identify and authenticate the networked device based on the digital certificate or a component of the digital certificate. In one embodiment, a digital certificate can be used to certify a cryptographic key, such as a public key stored by a device. For example, the networked device can transmit a public key and a digital certificate to the IoT server. The digital certificate can include the public key. The IoT server can use the digital certificate to authenticate ownership of the public key by the networked device and can use the public key to decode encrypted data from the networked device.

A component of the digital certificate can be a digital signature. The digital signature and other components of a digital certificate can be generated using asymmetric cryptography. For example, a digital signature can be generated by signing data using a private key. The private key can be stored by a PKI server associated with the PKI system issuing the digital certificate. The private key (secret key) can be mathematically paired with a corresponding public key as a public-private key pair. The public key can be a component of the digital certificate. The digital signature can be verified using the corresponding public key. In this manner, a number of devices with access to the public key can receive and decrypt an encrypted message. However, only devices with access to the private key can transmit encrypted (signed) messages that can be decrypted. Devices without access to the private key cannot impersonate the devices with access to the private key. In one example, a networked device with a private key can transmit the corresponding public key and a digital certificate to a receiving device, such as an IoT server. The receiving device can authenticate the public key using the digital certificate and can then use the public key to decrypt messages from the networked device, the messages being encrypted with the networked device's private key. Digital certificates can be issued and signed by a computing device (e.g., security server 100) that can be referred to herein as a certificate authority (CA). A certificate authority can be configured to store or access cryptographic key data. For example, a CA can sign a number of digital certificates using a number of public keys.

In one embodiment, a security server can use a multi-tier security system to sign a digital certificate. For example, a root CA can use a root secret key to sign a certificate of a signing CA. The signing CA can then sign a digital certificate for a device using a signing secret key. The digital certificate for the device can include a public key of a key pair generated by a device manufacturer. Examples of digital certificates can include, but are not limited to, device attestation certificates (DACs), product attestation intermediate (PAI) certificates, and product attestation authority (PAA) certificates. Digital certificates can be organized in a hierarchical structure, such as a chain, wherein a certificate is issued and digitally signed based on a following certificate in the chain. For example, a DAC can be signed by a PAI CA as a signing CA, and a PAI certificate can be signed by a PAA CA as a root CA. In one embodiment, a first digital certificate can include computer-readable instructions for generating and/or signing a following digital certificate. Digital certificates can be written to device storage, e.g., the persistent storage of a networked device, during the provisioning and manufacturing process.

In one embodiment, the security server 100 of the present disclosure can generate one or more digital certificates for a networked device 110 based on origin security credentials of the networked device 110. The origin security credentials can be security credentials that are generated and written to the IC chip 130 of the networked device 110 prior to integration of the IC chip 130 into the networked device 110. In one embodiment, the origin security credentials can be written to the IC chip 130 during or after integration into the networked device 110. In one embodiment, the origin security credentials can include an origin digital certificate ("chip certificate," first digital certificate) and an origin cryptographic key, e.g., an origin public-private key pair. In one embodiment, the chip certificate can be issued and digitally signed by a CA. The origin security credentials can be installed when the IC chips are manufactured and can be highly secure as a result. For example, it is unlikely that an intermediate party can intercept and replace or copy the origin security credentials during preparation of the IC chips. The origin security credentials of an IC chip 130 can be referred to as origin security credentials of a networked device 110 into which the IC chip 130 is or will be installed, embedded, attached, or otherwise included as part of the networked device 110.

Figure 2:
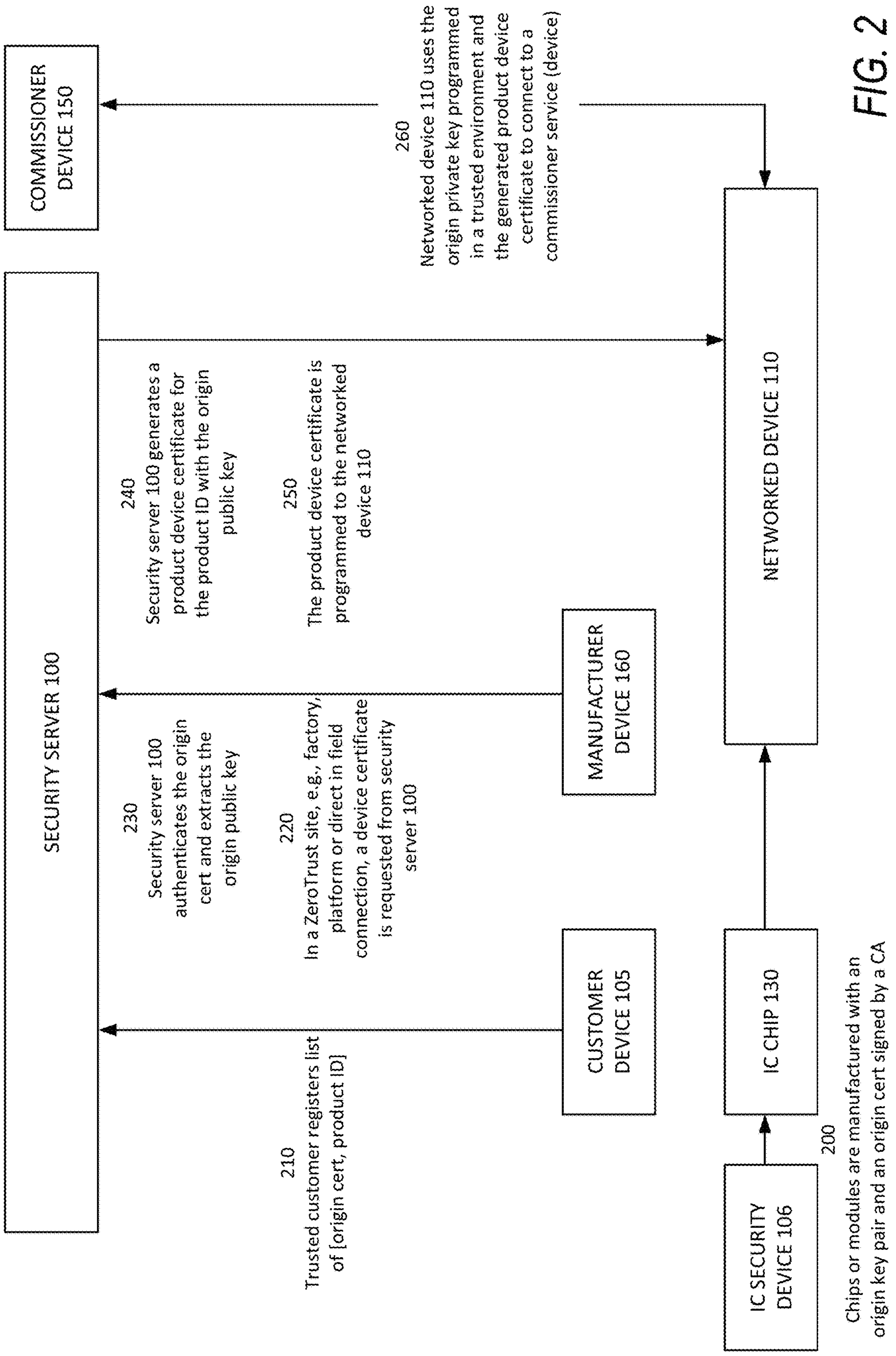
FIG. 2 is a schematic of a system for provisioning and commissioning a networked device, according to an embodiment of the present disclosure.

FIG. 2 is an illustration of a process for generating security credentials, according to one embodiment of the present disclosure. An IC chip 130 can be manufactured in step 200 with origin security credentials including an origin public-private key pair and an origin chip certificate (cert) signed by a CA. In one embodiment, the origin security credentials can be generated by a security controller hardware module in the IC chip 130. In one example, the IC chip 130 can receive data or instructions from an IC security device 106 associated with a chip manufacturer security system to generate the origin security credentials. The origin security credentials can be generated at a trusted site (using a trust architecture). The origin security credentials can be written to the IC chip 130.

The security server 100 can receive a product registration request from a device (e.g., the customer device 105 or a manufacturer device 160) at step 210. The product registration request can include the origin security credentials for the IC chip 130 and product information associated with the IC chip 130 and/or the networked device 110 in which the IC chip 130 will be installed. The origin security credentials in the product registration request can include an origin chip certificate and the origin public key from the origin public-private key pair of the IC chip. In one embodiment, the origin security credentials can be reported as a list of origin chip certificates and a list of origin public keys for multiple product registration requests. In one embodiment, the product registration request can include security credentials associated with user or owner of the networked device 110.

The product information included in the product registration request can include, for example, a product identifier (ID), such as a serial number, device type, etc. The product information can further include a vendor ID. In one example, an IC chip 130 or a networked device 110 can be associated with a product ID. The customer device 105 can receive the product ID as an input and can transmit the product ID to the security server 100 in a product registration request. The product ID can be used to verify possession of the associated IC chip 130 or networked device 110. In one embodiment, the product registration request can include a certificate authority, such as a target PAI certificate for signing DACs. In one example, the target PAI certificate can be associated with a networked device standard or administrator. In one embodiment, the security server 100 can authenticate the origin public key. For example, the security server 100 can use the origin chip certificate, which includes a digital signature from a CA, to authenticate the origin public key. In one embodiment, the security server 100 can access an authentication service or authentication data. For example, the security server 100 can request or receive authentication data from a manufacturer server or user device (e.g., IC security device 106) that is configured to store origin security credentials. In one example, the authentication data can be an encrypted file, e.g., a PGP file ("Pretty Good Privacy" file) containing origin public key data. In one embodiment, the security server 100 can store the origin security credentials and the product information in a linked data structure, e.g., in a list. In one embodiment, the product registration request from the customer device 105 can include ownership data, such as security credentials associated with the customer device 105 or a user of the customer device 105. For example, the product registration request can include security credentials associated with a vendor generating the product registration request. The server can authenticate the security credentials associated with the customer device 105 or the user thereof.

In one embodiment, the security server 100 can receive a product credential request at step 220. In one embodiment, the product credential request can be received from the manufacturer device 160. For example, the manufacturer device 160 can transmit the product credential request when the networked device 110 is being assembled in order to provision the networked device 110. In one embodiment, the product credential request can be received from a networked device 110, wherein the IC chip 130 has been embedded in the networked device 110. In one embodiment, the product credential request can be received from the customer device 105. For example, the customer device 105 can transmit the product credential request after registering the product with the security server 100. The product credential request can include a request to generate security credentials, including one or more digital certificates, for the networked device 110. In one embodiment, the product credential request can be received from the networked device 110 in a Zero Trust environment. For example, the product credential request can be received from the networked device 110 the first time that the networked device 110 connects to a communication network after assembly and deployment. The product credential request can include product information, such as a product ID and/or vendor ID of the networked device 110. In one embodiment, the product credential request can include an origin digital certificate of the IC chip 130 embedded in the networked device 110 for which product credentials are being requested. In step 230, the security server 100 can authenticate the origin digital certificate of the IC chip received in step 210 and extract the origin public key of the IC chip. The security server 100 can verify ownership of the IC chip 130 and/or the networked device 110 by comparing data received in the product registration request and the product credential request. For example, the security server 100 can verify ownership of the IC chip 130 and/or the networked device 110 based on the product information (e.g., a product ID) and/or the origin digital certificate received in the product registration request in step 210 and the product credential request.

In step 240, the security server 100 can generate a product digital certificate (second digital certificate) associated with, or including, the product ID and/or the vendor ID of the networked device 110. The product digital certificate can be generated based on the origin public key of the IC chip 130 installed in the networked device 110. Thus, the public key of the product digital certificate can be the origin public key from the secure origin public-private key pair that was initially installed on the IC chip 130. In one embodiment, the product digital certificate can be a digital certificate chain. For example, the product digital certificate can include a DAC signed by a PAI certificate. The digital certificate chain can be referred to herein as a DAC chain. In one embodiment, the security server 100 can digitally sign the DAC as a CA. In one embodiment, the security server 100 can request a digital signature from a separate CA. For example, the security server 100 can request the digital signature from a CA associated with a vendor or a customer of the networked device 110. In one example, the separate CA can include a PAI certificate.

In one embodiment, the security server 100 can transmit the security credentials to the networked device 110, the security credentials including the DAC chain. In one embodiment, the DAC chain (e.g., the DAC, the PAI certificate) can include the origin public key, the product ID, and the vendor ID. In one embodiment, the security server 100 can transmit the security credentials for the networked device to a manufacturer device 160 configured to program or transmit data to the IC chip 130 of the networked device. The manufacturer device 160 can be in network communication with the customer device 105 or the IC security device 106 and/or the security server 100. In one embodiment, the manufacturer device 160 can be an example of the devices 105 or 106. In one embodiment, the security server 100 can transmit the security credentials to the security controller hardware module of the networked device 110. For example, the security server 100 can write the new security credentials (e.g., the product digital certificate) to the security controller hardware module. In one embodiment, the security server 100 can modify data stored in or by the security controller hardware module to include the product digital certificate. For example, the server can modify the origin security credentials of the networked device 110 to include the product digital certificate. The origin private key can remain hardware protected on/by the security controller hardware module and is not accessed by other devices. The networked device 110 can then be commissioned by transmitting the product digital certificate and the origin public key to a commissioner device 150.

The provisioning steps of FIG. 2 can be performed during and after assembly of the networked device 110. In one embodiment, the security server 100 can receive the product credential request from the manufacturer device 160 or the networked device 110 when the networked device 110 is being assembled. In one embodiment, the security server 100 can receive the product credential request after the networked device 110 has been assembled. For example, the networked device 110 can be manufactured in a factory, and the security server 100 can receive the product credential request after the networked device 110 has been deployed from the factory. The factory can be an offline factory, wherein the networked device 110 does not have access to the security server 100 or to other IoT infrastructure during manufacturing. The security server 100 can generate the security credentials for just-in-time provisioning (JITP) at the first attempt by the networked device 110 to connect with a communication network. The security server 100 can use the origin public key, received in step 210, to generate the security credentials, including the DAC chain, at any time and regardless of where the networked device 110 is located. Advantageously, the security server 100 does not need to perform any key generation during provisioning because the origin public-private key pair is being used to generate the security credentials and authenticate the networked device 110. There is no need to transmit a private key to or from the networked device 110 during provisioning because the origin private key has already been programmed to the IC chip 130 prior to assembly of the networked device 110. Therefore, the data that is received, generated, and transmitted by the networked device 110 is not subject to trusted security functions. In one embodiment, the security server 100 can be configured to generate and transmit the security credentials in a Zero Trust environment. The provisioning by the security server 100 is compatible with Zero Trust authentication standards.

Commissioning of a networked device can refer to a process of authenticating a networked device and adding the networked device to a set or network of devices. In one embodiment, the set of devices can be referred to as a fabric. A networked device can transmit security credentials received during provisioning to a commissioner device 150 (e.g., a computer, a server, a user device) during the commissioning process so that the commissioner device 150 can authenticate the identity of the networked device as a device with a known and verified manufacturer or owner. In one embodiment, commissioning can include an attestation process, wherein the attestation process includes extracting a DAC and a PAI certificate from a networked device and requesting a digital signature from the networked device. The digital signature can be generated by the networked device using a private key.

In one embodiment, the networked device 110 can transmit the security credentials received from the security server 100 to the commissioner device 150 in step 260. The security credentials can include the DAC chain, the origin public key of the IC chip 130 included in the networked device 110, the product ID associated with the networked device 110, and the vendor ID associated with the networked device 110. The commissioner device 150 can verify any portion of the security credentials. For example, the commissioner device 150 can determine whether the product ID and the vendor ID correspond to legitimate products and vendors. The commissioner device 150 can authenticate the origin public key using the DAC chain. In one embodiment, the commissioner device 150 can transmit an attestation request (also referred to as a challenge request) for a digital signature to the networked device 110. The networked device 110 can use the origin private key to generate a digital signature in response to the attestation request. The digital signature can be used by the commissioner device 150 to authenticate the networked device 110. In one embodiment, the commissioner device 150 can transmit a certificate signing request (CSR) to the networked device 110 as part of the commissioning workflow. A CSR can be a request to establish a public-private key pair for use in future encryption between the commissioner device 150 and the networked device 110. In one embodiment, the networked device 110 can use the origin public-private key pair to sign the CSR. In this manner, the security server 100 and the networked device 110 do not need to perform on-board or off-board key generation in order to properly commission the networked device 110.

By providing the commissioner device 150 with the origin public key of the IC chip, the networked device 110 can establish an asymmetric encryption protocol between the networked device 110 and the commissioner device 150. The networked device 110 can encrypt data (e.g., generate digital signatures) using the origin private key of the IC chip 130. The encrypted data can be decrypted by the commissioner device 150 having the origin public key. The origin public key can also be propagated to other devices by the commissioner device 150 or the networked device 110. The use of the origin public-private key pair in provisioning and commissioning can be beneficial in that the origin security credentials were securely created and programmed to the IC chip 130 and have not been tampered with since the IC chip 130 was first programmed. In one embodiment, the origin private key of the IC chip 130 can remain on the IC chip 130 and does not need to be transmitted to another device. There is little opportunity for a malicious actor to access the origin private key that has been programmed into the IC chip 130. As a result, it is unlikely that the origin private key will be extracted or replaced by a rogue key.

Figure 3:
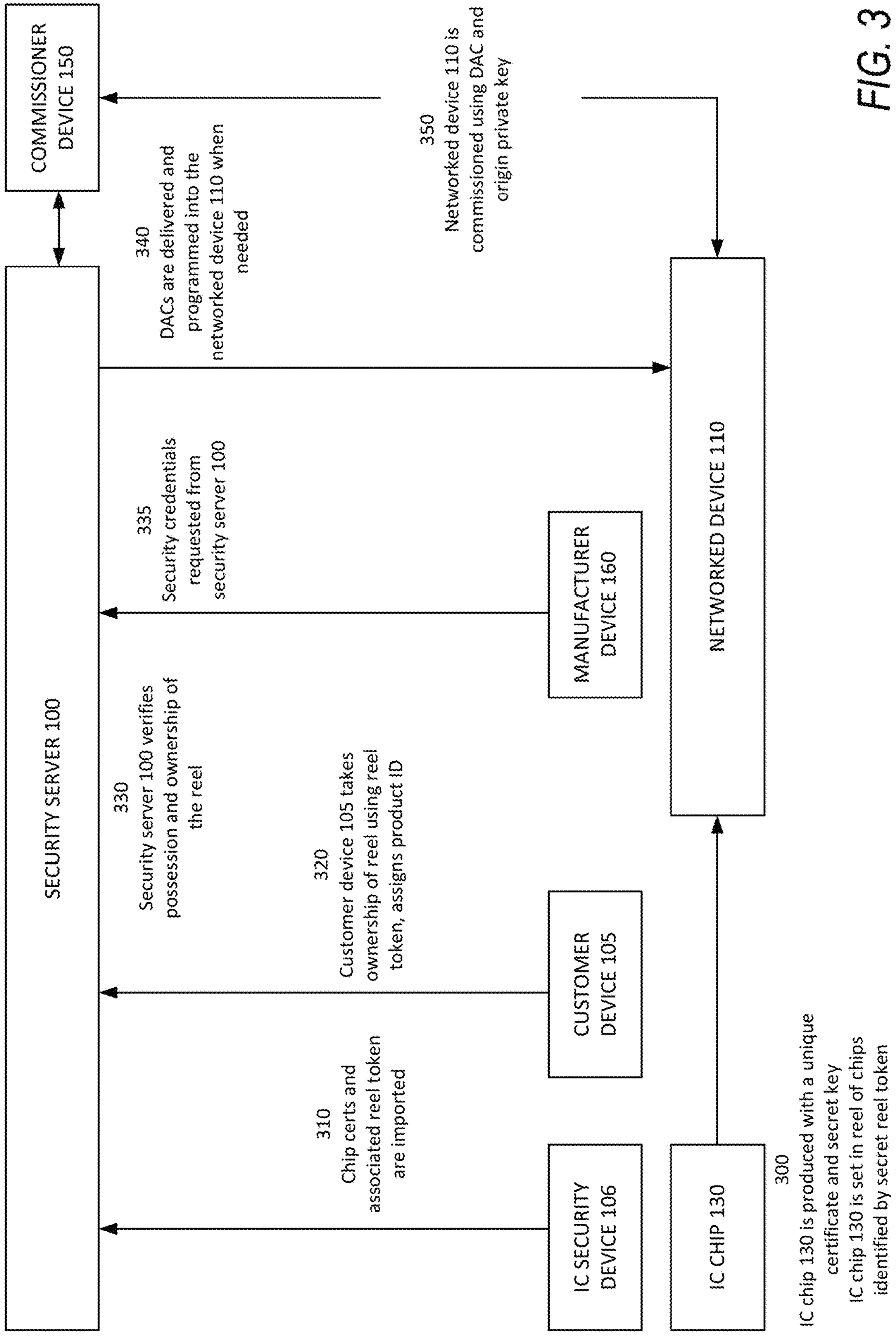
FIG. 3 is a schematic of a system for provisioning and commissioning a networked device, according to an embodiment of the present disclosure.

FIG. 3 is an illustration of a process for generating security credentials, according to one embodiment of the present disclosure. An IC chip 130 can be manufactured in step 300 with origin security credentials including an origin public-private key pair and an origin chip certificate signed by a CA. In one embodiment, the origin security credentials can be generated by a security controller hardware module. The security controller hardware module can be integrated into the IC chip 130 or a corresponding networked device. The origin security credentials can be programmed to the IC chip 130 at a trusted site (using a trust architecture). In one embodiment, the IC chip 130 can be manufactured as one of a reel of IC chips, each IC chip 130 in the reel having its own origin security credentials. The reel of IC chips can be assigned a reel identifier (reel ID), also referred to as a reel token, device ID, or device token. The reel token can be a secret token. In one embodiment, the IC chip 130 can be assigned an individual device token, e.g., an IC chip ID.

In step 310, the security server 100 can receive (import) identifying data related to the IC chip (IC chip data) in a chip registration process. The identifying data can include the reel ID (e.g., a token) and the origin security credentials of the IC chips in the reel. In one embodiment (e.g., wherein the IC chip is not part of a reel of IC chips), the identifying data can include an IC chip ID. In one embodiment, the security server 100 can receive the reel token and the origin security credentials from a user device, such as IC security device 106, associated with the reel of IC chips. For example, IC security device 106 can be a computer or server configured to store reel tokens and origin security credentials that are programmed during the IC chip manufacturing process. In one example, IC security device 106 can be associated with a vendor of IC chips. The security server 100 can receive IC chip data for IC chips that are manufactured for customers. Thus, the security server 100 can already store the IC chip data before the IC chips are used by customers.

The security server 100 can import the IC chip data prior to receiving a product registration request from a customer device 105. For example, the security server 100 can receive the IC chip data from the IC security device 106 when the reel of IC chips has been manufactured or has been purchased. The security server 100 can store the IC chip data before the IC chips are designated for a specific type of networked device (product). In one example, the security server 100 can first receive the IC chip data from an IC security device 106 without a product ID. The security server 100 can then receive the product ID to be associated with an IC chip at a later time, e.g., when the IC chip 130 is embedded in a networked device 110. In this manner, the security server 100 can import IC chip data for generic IC chips before they are embedded in a specific type of networked device (product) or owned by a specific user (e.g., vendor). The chip registration process can be beneficial in that the origin security credentials can be stored in a central location (the security server 100) even when the IC chips will be distributed and used by different customers. In addition, the origin security credentials of the IC chip 130 do not need to be transmitted to downstream devices, such as the customer device 105, for provisioning. The security server 100 can store the IC chip data, including the origin security credentials, in a secure manner prior to distribution of the IC chips.

In step 320, the security server 100 can receive a product registration request from a device, such as the customer device 105 or a manufacturer device 160. In one embodiment, the product registration request can refer to a request to take ownership of an IC chip 130 or a reel of IC chips after the security server 100 has already imported the IC chip data. In one embodiment, the product registration request can include a reel token and a product ID and vendor ID to be associated with each IC chip 130 in the reel of IC chips. In this manner, the product registration request can include identifying information about an IC chip 130 without needing to explicitly include the origin security credentials of the IC chip 130. The security server 100 can receive IC chip data and product data in separate steps or from different devices and can still associate the correct IC chip 130 with the product ID and vendor ID using the reel token.

In one example, the customer device 105 or the security server 100 can receive an input identifying the reel of IC chips. The input can be an image input (e.g., a quick response (QR) code associated with the reel of IC chips) or a text input (e.g., a text-based reel token or reference to the reel token). The customer device 105 or the security server 100 can use the input to identify the reel of IC chips for the product registration request. In one example, the reel token can be printed on the packaging of the reel of IC chips. The reel token can be kept secret (sealed) in the packaging and can only be accessed by a user in physical possession of the reel to prevent provisioning of illegitimate networked devices.

In step 330, the security server 100 can verify ownership of the reel based on the product registration request. For example, the security server 100 can verify that the reel token received from the customer device 105 matches the reel token received from the IC security device 106. In one embodiment, the security server 100 can verify that the product ID and the vendor ID received in the product registration request are legitimate. In step 335, the security server 100 can receive a request to generate security credentials for the networked device, wherein the security credentials can include a product digital certificate and the origin public key of the IC chip 130 as described with reference to FIG. 2. In one embodiment, the security server 100 can receive the request from a manufacturer device 160 or the customer device 105. In one embodiment, the security server 100 can receive the request from the networked device 110.

In step 340, the security server 100 can generate and program the security credentials to the networked device 110, as described with reference to step 250 of FIG. 2. The networked device 110 can use the security credentials during device commissioning in step 350, as is described herein with reference to step 260 of FIG. 2. In one embodiment, the private key of the DAC, which is the origin private key of the IC chip 130, is not cloned during the provisioning process. The private key remains hardware protected in the security controller hardware module of the IC chip 130.

In one embodiment, the chip registration process can be used for batch digital certificate delivery. For example, the security server 100 can first receive IC chip data including a reel token prior to receiving a product registration request. At a later point, the security server 100 can receive a product registration request to take ownership of a reel of IC chips and a request for a batch (bundle) of security credentials, the batch including security credentials for a plurality of IC chips in the reel. The security server 100 can generate the batch of security credentials and can transmit the batch after receiving the product registration request.

Figure 4:
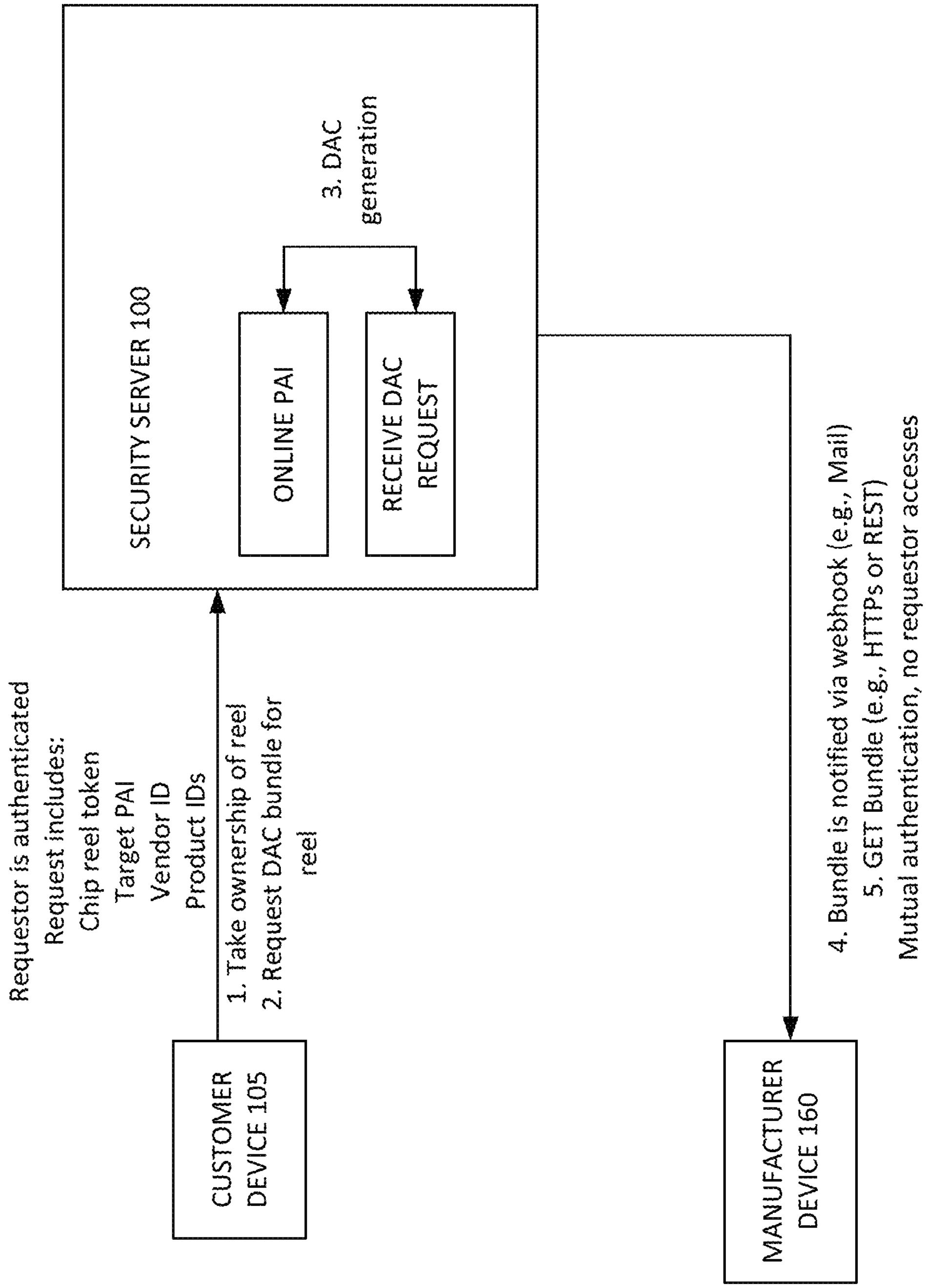
FIG. 4 is a schematic of a system for requesting security credentials for a networked device, according to an embodiment of the present disclosure.

FIG. 4 is an illustration of a method for generating security credentials for a reel of IC chips. The security server 100 can receive a request from a customer device 105 to take ownership of the reel. In one embodiment, the product registration request and the product credential request can be received by the security server 100 as a single request and/or from a single device. The request can include a reel token, a target PAI certificate for signing the DAC, a vendor ID, and product IDs. The security server 100 can also receive a request for a DAC bundle for the reel, wherein the DAC bundle can include a DAC or a DAC chain for each IC chip in the reel. In one embodiment, the security server 100 can be in network communication with a device associated with a manufacturer of the IC chips, e.g., a manufacturer server. Therefore, when the manufacturer server receives a request to manufacture the IC chips, the manufacturer server can transmit a request to the security server 100 for security credentials for the requested IC chips. The security server 100 can authenticate the requestor, e.g., by authenticating the customer device 105 or a user ID associated with the requestor. The security server 100 can generate the product digital certificates, including a DAC chain. The security server 100 can include an online PAI certificate designated by the request from the customer device 105 and can use the online PAI certificate to sign the product digital certificates.

In one embodiment, the security server 100 can transmit a notification indicating that the security credentials have been generated. The security server 100 can transmit the notification to a device in a manufacturing environment (e.g., a factory) where the networked device 110 is assembled. For example, the security server 100 can transmit the notification to a networked device 110 or to a manufacturer device 160. The manufacturer device 160 can be a device configured to read and write data to and from an IC chip 130 or a networked device 110. For example, the manufacturer device 160 can be a computer located at a factory where the networked device 110 is assembled. The manufacturer device 160 receiving the notification can request and receive the security credentials from the security server 100. The user device can then program the security credentials to the networked device 110 via a wired or wireless connection. In one embodiment, data can be transmitted between the security server 100 and the user device over a communication network. In one embodiment, data can be requested and transmitted via transfer protocols such as hypertext transfer protocol (HTTP), webhooks, representational state transfer application performing interfaces (REST APIs), etc. In one embodiment, the manufacturer device 160 can be in an offline factory. In one embodiment, the manufacturer device 160 can receive the DAC bundle prior to production of the networked devices and can be offline during the production of the networked devices. The security server 100 can transmit data to the manufacturer device 160 via mutual authentication between the security server 100 and the manufacturer device 160. In this manner, the manufacturer device 160 does not need to receive or grant access to the customer device 105.

Figure 5:
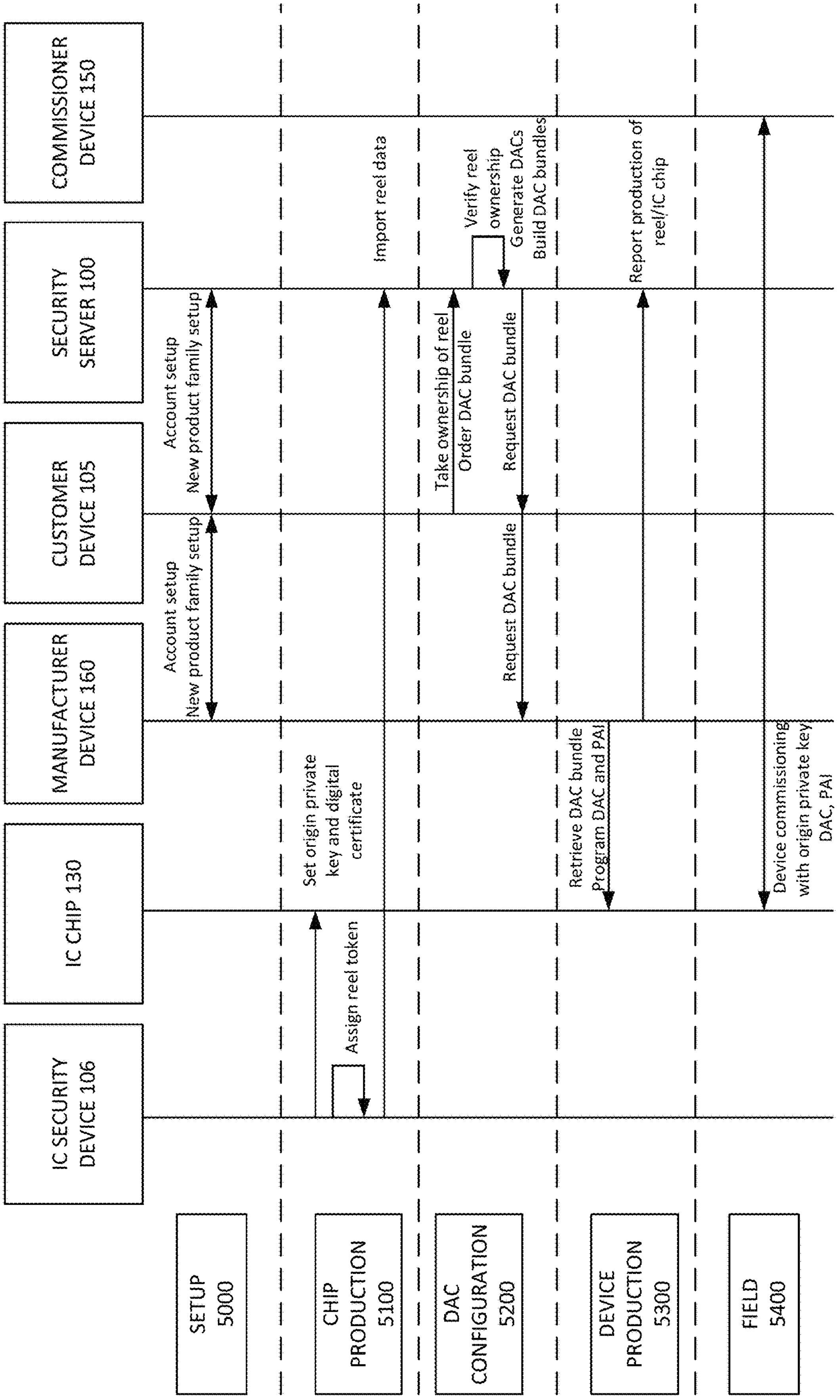
FIG. 5 is a schematic of a system for provisioning and commissioning a networked device, according to an embodiment of the present disclosure.

FIG. 5 is a schematic of an environment for provisioning and commissioning a networked device. The networked device can include an IC chip 130, wherein the IC chip 130 can include a security controller hardware module. During customer setup 5000, a customer device 105 can transmit user account and product family information to the security server 100. The customer device 105 can be associated with a customer of IC chips. The customer device 105 can also transmit the user account and product family information to a manufacturer device 160. During chip production 5100, a reel of IC chips can be produced. IC security device 106 can transmit instructions to each IC chip to generate origin security credentials, including an origin digital certificate and an origin public-private key pair. In one embodiment, the IC security device 106 can generate origin security credentials and can transmit the origin security credentials to the IC chip 130. The IC security device 106 can also assign an IC chip ID (e.g., a reel token) to the reel of IC chips. The IC security device 106 can transmit the IC chip data (reel data), including the origin security credentials and the reel token, to the security server 100 in a chip registration process.

During DAC configuration 5200, the customer device 105 can transmit a product registration request to the security server 100. The product registration request can include a request to take ownership of the reel as identified by the reel token. The product registration request can also include a request for security credentials (e.g., a DAC) for each IC chip 130 in the reel. The product registration request can include product IDs and vendor IDs associated with the reel of IC chips. The security server 100 can verify ownership of the reel based on the reel tokens received from the IC security device 106 and the customer device 105. The reel token can be a secret token. If the reel token from the product registration request matches the reel token from the IC chip registration, the security server 100 can verify ownership of the reel. The security server 100 can generate product digital certificates, including DAC chains based on the origin digital certificates and origin public keys of the IC chips. The security server 100 can digitally sign the DACs using a PAI. In one embodiment, the DAC chains can include DACs, PAI certificates, and policy-based signatures (PBSs). The security server 100 can transmit the DAC bundles to the customer device 105. In one embodiment, the security server 100 can transmit a notification to the customer device 105 indicating that the DAC bundles have been generated. The customer device 105 can then request the DAC bundles from the security server 100, e.g., via a data transfer protocol. The customer device 105 can transmit the DAC bundles to the manufacturer device 160. During device production 5300, the manufacturer device 160 can program the security credentials, including the DAC chain (the DAC and the PAI certificate), from the security server 100 to the security controller hardware module of the IC chip 130.

In one embodiment, the manufacturer device 160 can transmit a report to the security server 100 indicating that the security credentials were programmed to the IC chip 130. The report can be transmitted via a data transfer protocol. In step 5400, the IC chip 130 can be commissioned in the field. In one embodiment, a commissioner device 150 can access the security credentials of the IC chip 130 from the security server 100. In one embodiment, the IC chip 130 can transmit the security credentials to a commissioner device 150 when the networked device 110 is deployed for field use 5400. The security credentials transmitted to the commissioner device 150 can include the DAC and the PAI certificate for device commissioning. The IC chip 130 can also use the origin private key for commissioning. For example, the IC chip 130 can use the origin private key to digitally sign a request or response used for commissioning of the networked device 110.

Figure 6:
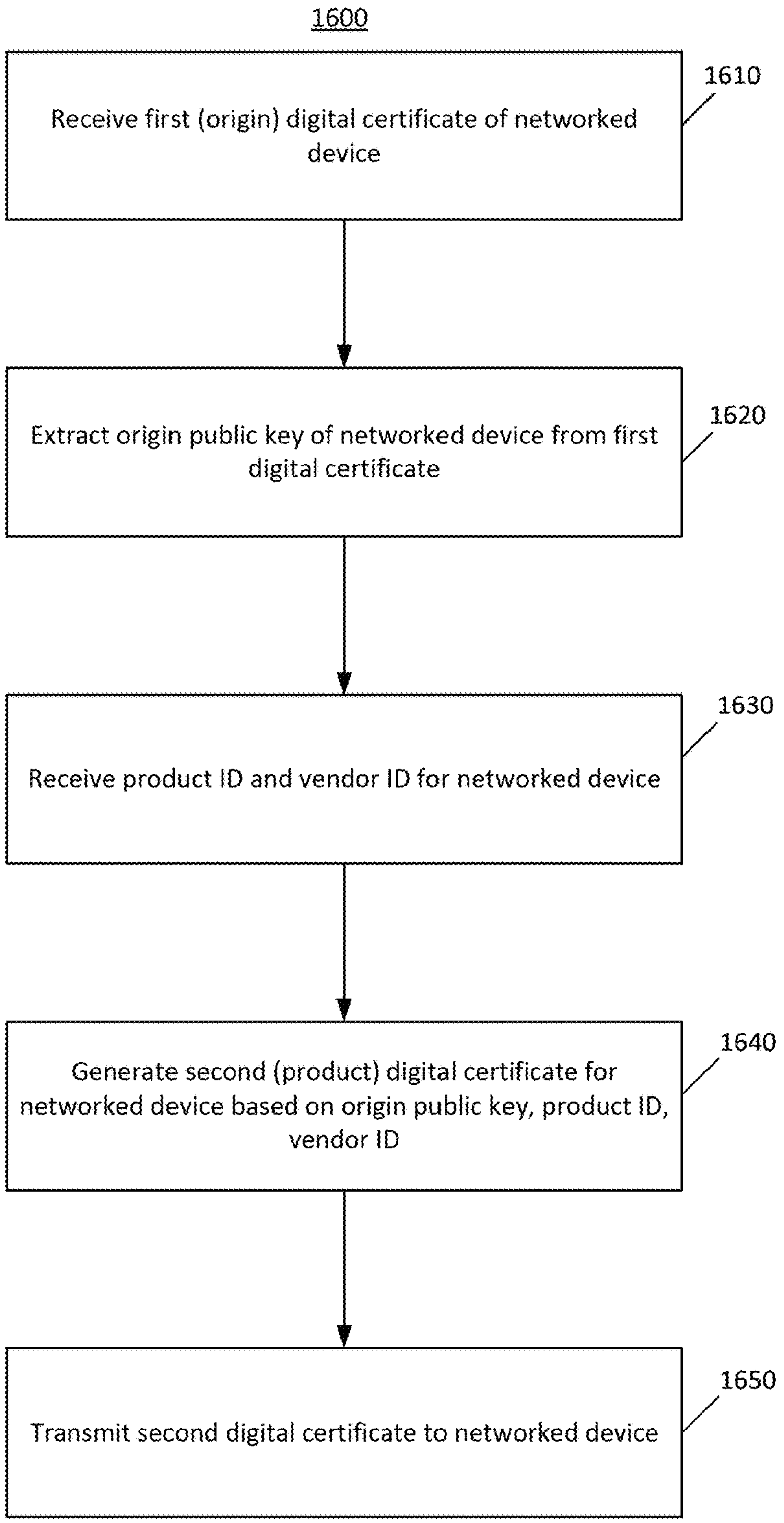
FIG. 6 is a method for provisioning a networked device, according to an embodiment of the present disclosure.

FIG. 6 is an illustration of a method 1600 for provisioning a networked device, according to one embodiment of the present disclosure. The method can be performed by the security server 100 and specifically by processing circuitry of the security server 100, including components described in reference to the computing and user devices of FIGS. 7-9. In step 1610, the security server 100 can receive a first digital certificate of a networked device, the first digital certificate being the origin digital certificate of the networked device. In step 1620, the security server 100 can extract a public key (the origin public key) of the networked device from the first digital certificate (origin digital certificate). The origin digital certificate can include the origin public key. The origin public key can be a public key generated for the networked device, e.g., by the security controller hardware module of an IC chip included in the networked device. The origin public key can correspond to an origin private key of the IC chip to form a public-private key pair for asymmetric cryptography. In step 1630, the security server 100 can receive a product ID and a vendor ID to be associated with the networked device. The security server 100 can receive the product ID and the vendor ID from a user device. In one embodiment, the security server 100 can receive the product ID and the vendor ID from the user device as part of a request to take ownership of the networked device and/or to generate security credentials for the networked device.

In step 1640, the security server 100 can generate security credentials for the networked device, the security credentials including a second digital certificate (product digital certificate) including or based on the origin public key, the product ID, and the vendor ID. In one embodiment, the second digital certificate can include a DAC or DAC chain. The security server 100 can transmit the second digital certificate to the networked device in step 1650. In one embodiment, the security server 100 can transmit the second digital certificate to a user device, such as manufacturer device 160, to be transmitted to the networked device. The networked device can then use the second digital certificate and the origin public key, which corresponds to the origin private key initially generated by the networked device, for device commissioning.

Embodiments of the subject matter and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as the security server 100, the devices 105, 106, the commissioner device 150, the manufacturer device 160, the networked devices 110, 111, 11*n*, and the like. The computer storage medium can be a machine-readable storage device, a machine-readable storage substrate, a random or serial access memory device, or a combination of one or more of them.

Each of the functions of the described embodiments can be implemented by one or more processing circuits/processing circuitry (may also be referred to as a controller). A processing circuit includes a programmed processor (for example, a CPU of FIG. 8), as a processor includes circuitry. A processing circuit can also include devices such as an application specific integrated circuit (ASIC) and circuit components arranged to perform the recited functions.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
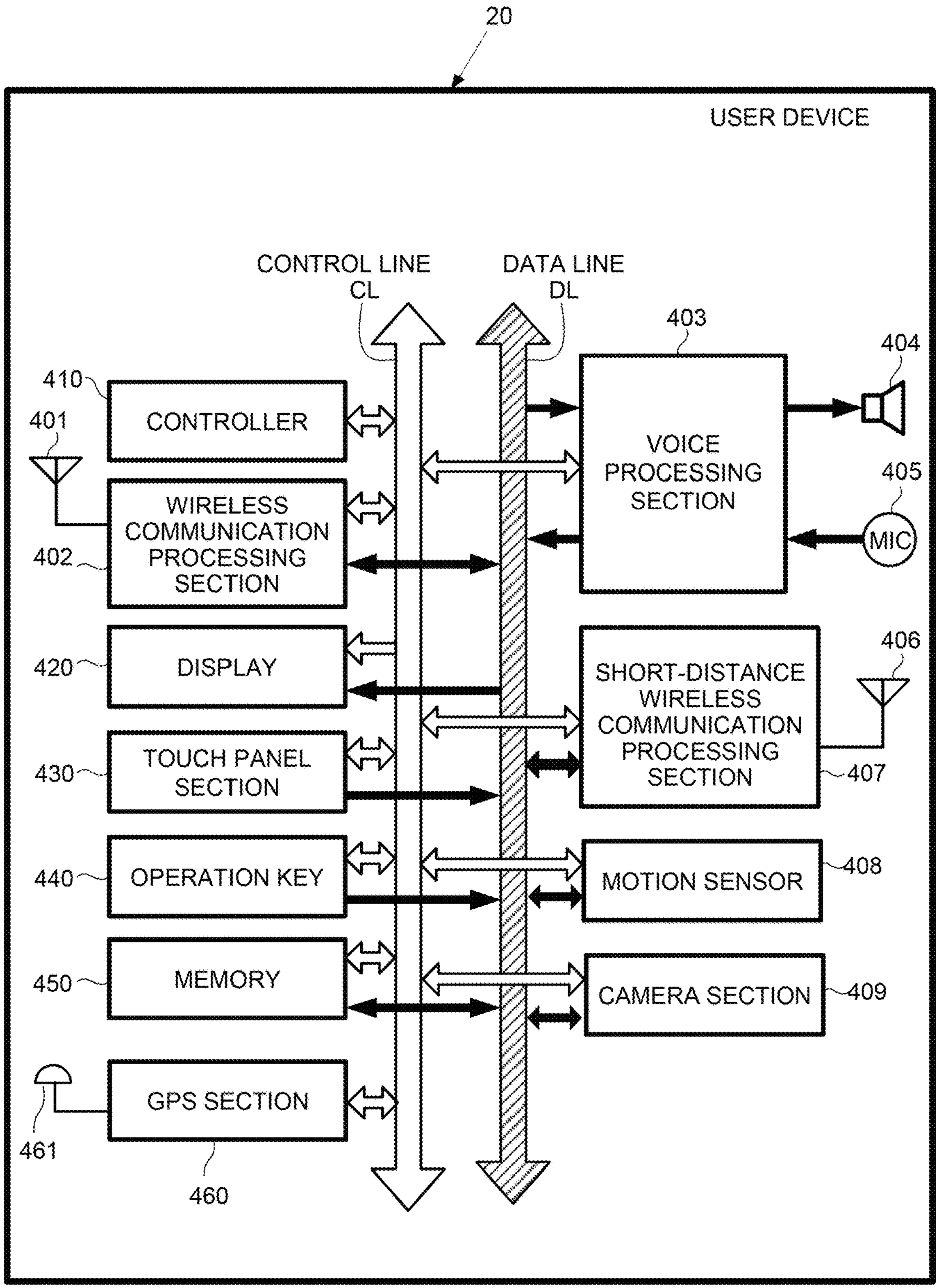
FIG. 7 is a schematic of a user device for performing a method, according to an embodiment of the present disclosure.

Electronic user device 20 shown in FIG. 7 can be an example of one or more of the devices described herein, including the devices 105, 106, 160, or any of the networked devices 110, 111, **11*n*. In an embodiment, the electronic user device 20 may be a smartphone. However, the skilled artisan will appreciate that the features described herein may be adapted to be implemented on other devices (e.g., a laptop, a tablet, a server, an e-reader, a camera, a navigation device, etc.). The example user device 20 of FIG. 7 includes processing circuitry, as discussed above. The processing circuitry includes one or more of the elements discussed next with reference to FIG. 7. The electronic user device 20 may include other components not explicitly illustrated in FIG. 7 such as a CPU, GPU, frame buffer, etc. The electronic user device 20 includes a controller 410 and a wireless communication processor 402 connected to an antenna 401. A speaker 404 and a microphone 405 are connected to a voice processor 403**.

The controller 410 may include one or more processors/processing circuitry (CPU, GPU, or other circuitry) and may control each element in the user device 20 to perform functions related to communication control, audio signal processing, graphics processing, control for the audio signal processing, still and moving image processing and control, and other kinds of signal processing. The controller 410 may perform these functions by executing instructions stored in a memory 450. Alternatively or in addition to the local storage of the memory 450, the functions may be executed using instructions stored on an external device accessed on a network or on a non-transitory computer readable medium.

The memory 450 includes but is not limited to Read Only Memory (ROM), Random Access Memory (RAM), or a memory array including a combination of volatile and non-volatile memory units. The memory 450 may be utilized as working memory by the controller 410 while executing the processes and algorithms of the present disclosure. Additionally, the memory 450 may be used for long-term storage, e.g., of image data and information related thereto.

The user device 20 includes a control line CL and data line DL as internal communication bus lines. Control data to/from the controller 410 may be transmitted through the control line CL. The data line DL may be used for transmission of voice data, displayed data, etc.

The antenna 401 transmits/receives electromagnetic wave signals between base stations for performing radio-based communication, such as the various forms of cellular telephone communication. The wireless communication processor 402 controls the communication performed between the user device 20 and other external devices via the antenna 401. For example, the wireless communication processor 402 may control communication between base stations for cellular phone communication.

The speaker 404 emits an audio signal corresponding to audio data supplied from the voice processor 403. The microphone 405 detects surrounding audio and converts the detected audio into an audio signal. The audio signal may then be output to the voice processor 403 for further processing. The voice processor 403 demodulates and/or decodes the audio data read from the memory 450 or audio data received by the wireless communication processor 402 and/or a short-distance wireless communication processor 407. Additionally, the voice processor 403 may decode audio signals obtained by the microphone 405.

The example user device 20 may also include a display 420, a touch panel 430, an operation key 440, and a short-distance communication processor 407 connected to an antenna 406. The display 420 may be a Liquid Crystal Display (LCD), an organic electroluminescence display panel, or another display screen technology. In addition to displaying still and moving image data, the display 420 may display operational inputs, such as numbers or icons which may be used for control of the user device 20. The display 420 may additionally display a GUI for a user to control aspects of the user device 20 and/or other devices. Further, the display 420 may display characters and images received by the user device 20 and/or stored in the memory 450 or accessed from an external device on a network. For example, the user device 20 may access a network such as the Internet and display text and/or images transmitted from a Web server.

The touch panel 430 may include a physical touch panel display screen and a touch panel driver. The touch panel 430 may include one or more touch sensors for detecting an input operation on an operation surface of the touch panel display screen. The touch panel 430 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 430 may detect when the stylus approaches/contacts the operation surface of the touch panel display (similar to the case in which a finger is used for the touch operation).

In certain aspects of the present disclosure, the touch panel 430 may be disposed adjacent to the display 420 (e.g., laminated) or may be formed integrally with the display 420. For simplicity, the present disclosure assumes the touch panel 430 is formed integrally with the display 420 and therefore, examples discussed herein may describe touch operations being performed on the surface of the display 420 rather than the touch panel 430. However, the skilled artisan will appreciate that this is not limiting.

For simplicity, the present disclosure assumes the touch panel 430 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 430 may include transparent electrode touch sensors arranged in the X-Y direction on the surface of transparent sensor glass.

The touch panel driver may be included in the touch panel 430 for control processing related to the touch panel 430, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 430 may detect a position of a user's finger around an edge of the display panel 420 (e.g., gripping a protective case that surrounds the display/touch panel). Signals may be transmitted by the touch panel driver, e.g. in response to a detection of a touch operation, in response to a query from another element based on timed data exchange, etc.

The touch panel 430 and the display 420 may be surrounded by a protective casing, which may also enclose the other elements included in the user device 20. In an embodiment, a position of the user's fingers on the protective casing (but not directly on the surface of the display 420) may be detected by the touch panel 430 sensors. Accordingly, the controller 410 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 410 may be configured to detect which hand is holding the user device 20, based on the detected finger position. For example, the touch panel 430 sensors may detect fingers on the left side of the user device 20 (e.g., on an edge of the display 420 or on the protective casing), and detect a single finger on the right side of the user device 20. In this scenario, the controller 410 may determine that the user is holding the user device 20 with his/her right hand because the detected grip pattern corresponds to an expected pattern when the user device 20 is held only with the right hand.

The operation key 440 may include one or more buttons or similar external control elements, which may generate an operation signal based on a detected input by the user. In addition to outputs from the touch panel 430, these operation signals may be supplied to the controller 410 for performing related processing and control. In certain aspects of the present disclosure, the processing and/or functions associated with external buttons and the like may be performed by the controller 410 in response to an input operation on the touch panel 430 display screen rather than the external button, key, etc. In this way, external buttons on the user device 20 may be eliminated in lieu of performing inputs via touch operations, thereby improving watertightness.

The antenna 406 may transmit/receive electromagnetic wave signals to/from other external apparatuses, and the short-distance wireless communication processor 407 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 407.

The user device 20 may include a motion sensor 408. The motion sensor 408 may detect features of motion (i.e., one or more movements) of the user device 20. For example, the motion sensor 408 may include an accelerometer to detect acceleration, a gyroscope to detect angular velocity, a geomagnetic sensor to detect direction, a geo-location sensor to detect location, etc., or a combination thereof to detect motion of the user device 20. In an embodiment, the motion sensor 408 may generate a detection signal that includes data representing the detected motion. For example, the motion sensor 408 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 410, whereby further processing may be performed based on data included in the detection signal. The motion sensor 408 can work in conjunction with a Global Positioning System (GPS) section 460. The information of the present position detected by the GPS section 460 is transmitted to the controller 410. An antenna 461 is connected to the GPS section 460 for receiving and transmitting signals to and from a GPS satellite.

The user device 20 may include a camera section 409, which includes a lens and shutter for capturing photographs of the surroundings around the user device 20. In an embodiment, the camera section 409 captures surroundings of an opposite side of the user device 20 from the user. The images of the captured photographs can be displayed on the display panel 420. A memory section saves the captured photographs. The memory section may reside within the camera section 109 or it may be part of the memory 450. The camera section 409 can be a separate feature attached to the user device 20 or it can be a built-in camera feature.

Figure 8:
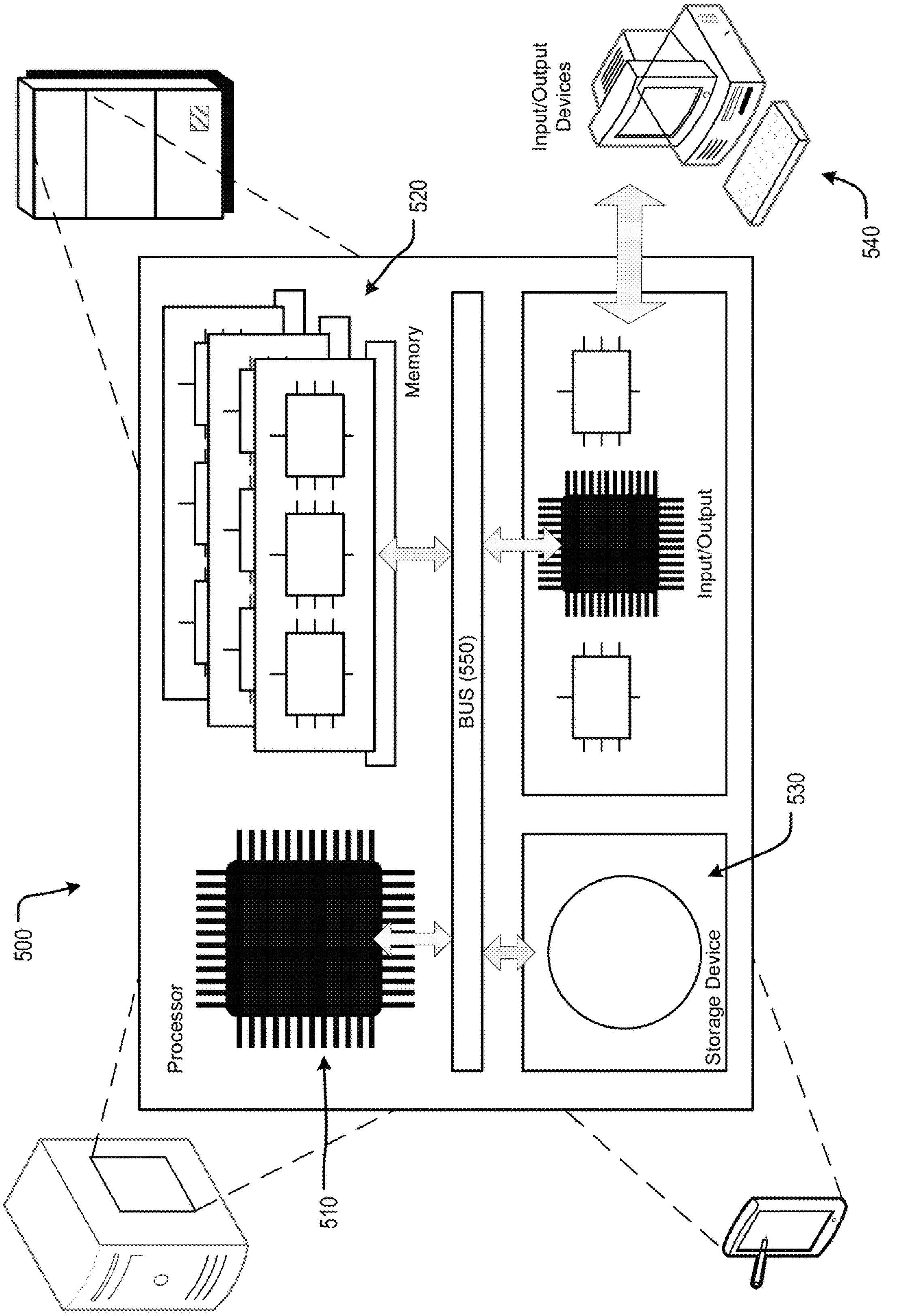
FIG. 8 is a schematic of a hardware system for performing a method, according to an embodiment of the present disclosure.

An example of a type of computer is shown in FIG. 8. The computer 500 can be used for the operations described in association with any of the computer-implement methods described previously, according to one implementation. For example, the computer 500 can be an example of a central computing device such as the security server 100 including processing circuitry, as discussed herein. The computer 500 can be an example of any of the devices 105, 106, the commissioner device 150, the manufacturer device 160, or the networked devices 110, 111, 11*n* in communication with the security server 100 via a communication network. The processing circuitry includes one or more of the elements discussed next with reference to FIG. 8. In FIG. 8, the computer 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the computer 500. In one implementation, the storage device 530 is a computer-readable medium. In various different implementations, the storage device 530 may be a floppy disk device, a hard disk device, an optical disk device, or a tape device.

The input/output device 540 provides input/output operations for the computer 500. In one implementation, the input/output device 540 includes a keyboard and/or pointing device. In another implementation, the input/output device 540 includes a display unit for displaying graphical user interfaces.

Figure 9:
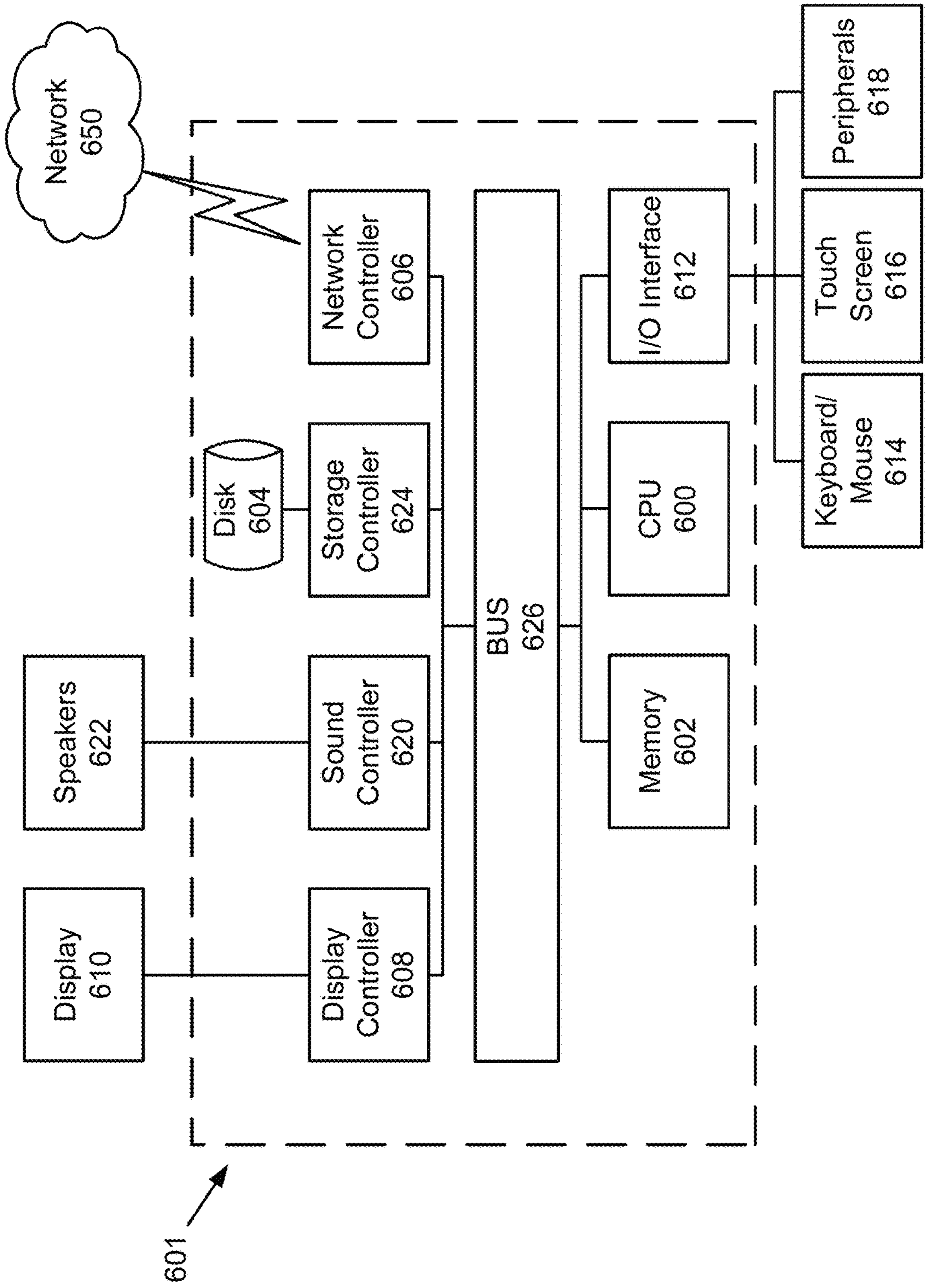
FIG. 9 is a schematic of a hardware configuration of a device for performing a method, according to an embodiment of the present disclosure.

Next, a hardware description of a device 601 according to an embodiment is described with reference to FIG. 9. In FIG. 9, the device 601, which can be any of the above described devices, including the security server 100, any of the networked devices 110, 111, 11*n*, the devices 105, 106, the manufacturing device 160, includes processing circuitry. The processing circuitry includes one or more of the elements discussed next with reference to FIG. 9. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 601 communicates, such as a server or computer.

Further, the claimed advancements may be provided as a utility application, background daemon, or component of an operating system, or combination thereof, executing in conjunction with CPU 600 and an operating system such as Microsoft Windows, UNIX, Solaris, LINUX, Apple MAC-OS and other systems known to those skilled in the art.

The hardware elements in order to achieve the device 601 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described above.

The device 601 in FIG. 9 also includes a network controller 606, such as an Intel Ethernet PRO network interface card from Intel Corporation of America, for interfacing with network 650. and to communicate with the other devices. As can be appreciated, the network 650 can be a public network, such as the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 601 further includes a display controller 608, such as a NVIDIA GeForce GTX or Quadro graphics adaptor from NVIDIA Corporation of America for interfacing with display 610, such as an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners.

A sound controller 620 is also provided in the device 601 to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the device 601. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Embodiments of the present disclosure may also be set forth in the following parentheticals.

(1) A method for provisioning a networked device with digital security credentials, comprising receiving, by processing circuitry of a security server, a first digital certificate of a secure component associated with the networked device; extracting, by the processing circuitry of the security server, a public key from the first digital certificate, the public key and a corresponding private key being stored in the secure component for asymmetric cryptography; receiving, by the processing circuitry of the security server, a product identifier and a vendor identifier associated with the secure component from a first user device; generating, by the processing circuitry of the security server, a second digital certificate including the public key of the secure component, the product identifier, and the vendor identifier; and transmitting, by the processing circuitry of the security server, the second digital certificate to the networked device associated with the secure component, the networked device being configured to generate a device commissioning request based on the second digital certificate and the private key of the secure component.

(2) The method of (1), wherein the second digital certificate includes a device attestation certificate and a product attestation intermediate certificate.

(3) The method of (1) to (2), further comprising authenticating the public key of the secure component based on authentication data received from a second user device.

(4) The method of (1) to (3), further comprising receiving a device identifier and verifying that the device token is associated with the secure component prior to generating the second digital certificate.

(5) The method of (1) to (4), further comprising receiving a request for the second digital certificate prior to generating the second digital certificate.

(6) The method of (1) to (5), further comprising receiving a digital signature of the second digital certificate from a certificate authority.

(7) The method of (1) to (6), wherein the device commissioning request includes the second digital certificate.

(8) A device comprising processing circuitry configured to receive a first digital certificate of a secure component associated with a networked device, extract a public key from the first digital certificate, the public key and a corresponding private key being stored in the secure component for asymmetric cryptography, receive a product identifier and a vendor identifier associated with the secure component from a first user device, generate a second digital certificate based on the public key of the secure component, the product identifier, and the vendor identifier, and transmit the second digital certificate to the networked device associated with the secure component, the networked device being configured to generate a device commissioning request based on the second digital certificate and the private key generated by the networked device.

(9) The device of (8), wherein the second digital certificate includes a device attestation certificate and a product attestation intermediate certificate.

(10) The device of (8) to (9), wherein the processing circuitry is configured to authenticate the public key of the secure component based on authentication data received from a second user device.

(11) The device of (8) to (10), wherein the processing circuitry is configured to receive a device identifier and verify that the device identifier is associated with the secure component prior to generating the second digital certificate.

(12) The device of (8) to (11), wherein the processing circuitry is configured to receive a request for the second digital certificate prior to generating the second digital certificate.

(13) The device of (8) to (12) wherein the processing circuitry is configured to receive a digital signature of the second digital certificate from a certificate authority.

(14) The device of (8) to (13), wherein the device commissioning request includes the second digital certificate.

(15) A non-transitory computer-readable storage medium for storing computer-readable instructions that, when executed by a computer, cause the computer to perform a method, the method comprising receiving a first digital certificate of a secure component associated with a networked device; extracting a public key from the first digital certificate, the public key and a corresponding private key being stored in the secure component for asymmetric cryptography; receiving a product identifier and a vendor identifier associated with the secure component from a first user device; generating a second digital certificate based on the public key of the secure component, the product identifier, and the vendor identifier; and transmitting the second digital certificate to the networked device associated with the secure component, the networked device being configured to generate a device commissioning request based on the second digital certificate and the private key of the secure component.

(16) The non-transitory computer-readable storage medium of (15), wherein the second digital certificate includes a device attestation certificate and a product attestation intermediate certificate.

(17) The non-transitory computer-readable storage medium of (15) to (16), wherein the method further comprises authenticating the public key of the secure component based on authentication data received from a second user device.

(18) The non-transitory computer-readable storage medium of (15) to (17), wherein the method further comprises receiving a device identifier and verifying that the device identifier is associated with the secure component prior to generating the second digital certificate.

(19) The non-transitory computer-readable storage medium of (15) to (18), wherein the method further comprises receiving a request for the second digital certificate prior to generating the second digital certificate.

(20) The non-transitory computer-readable storage medium of (15) to (19), wherein the method further comprises receiving a digital signature of the second digital certificate from a certificate authority.

(21) The method of (1) to (7), further comprising receiving ownership data associated with the secure component prior to generating the second digital certificate.

(22) The device of (8) to (14), wherein the processing circuitry is further configured to receive ownership data associated with the secure component prior to generating the second digital certificate.

(23) The non-transitory computer-readable storage medium of (15) to (20), wherein the method further comprises receiving ownership data associated with the secure component prior to generating the second digital certificate.

(24) A method for receiving digital security credentials for device commissioning, comprising receiving, by processing circuitry of a networked device, a product digital certificate, the product digital certificate being generated based on a public key of a secure component associated with the networked device, a product identifier associated with the secure component of the networked device, and a vendor identifier associated with the secure component of the networked device, the public key and a corresponding private key being stored in the secure component for asymmetric cryptography and the public key being included in an origin digital certificate of the secure component; generating, by the processing circuitry of the networked device, a device commissioning request based on the product digital certificate and the private key of the secure component; and transmitting, by the processing circuitry of the networked device, the device commissioning request to a commissioning device.

(25) The method of (24), wherein the product digital certificate includes a device attestation certificate and a product attestation intermediate certificate.

(26) The method of (24) to (25), further comprising receiving, after transmitting the device commissioning request and by the processing circuitry of the networked device, a request for a digital signature and generating the digital signature based on the private key of the secure component.

(27) A device comprising processing circuitry configured to receive a product digital certificate, the product digital certificate being generated based on a public key of a secure component associated with the device, a product identifier associated with the secure component of the device, and a vendor identifier associated with the secure component of the device, the public key and a corresponding private key being stored in the secure component for asymmetric cryptography, and the public key being included in an origin digital certificate of the secure component, generate a device commissioning request based on the product digital certificate and the private key of the secure component, and transmit the device commissioning request to a commissioning device.

(28) The device of (27), wherein the secure component is embedded in the device or connected to the device via a wired connection.

(29) The device of (27) to (28), wherein the product digital certificate includes a device attestation certificate and a product attestation intermediate certificate.

(30) The device of (27) to (29), wherein the processing circuitry is further configured to receive a request for a digital signature in response to the device commissioning request and generate the digital signature based on the private key of the secure component.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for provisioning a networked device with digital security credentials, comprising:

receiving, by processing circuitry of a security server, a first digital certificate of a secure component, the secure component being associated with the networked device;

extracting, by the processing circuitry of the security server, a public key from the first digital certificate, the public key and a corresponding private key being stored in the secure component for asymmetric cryptography;

receiving, by the processing circuitry of the security server, a product identifier and a vendor identifier associated with the secure component from a first user device;

receiving a device identifier;

verifying that the device identifier is associated with the secure component, wherein the product identifier and the device identifier are different;

generating, by the processing circuitry of the security server, a second digital certificate based on the public key of the secure component, the product identifier, and the vendor identifier after receiving the device identifier and verifying that the device identifier is associated with the secure component; and transmitting, by the processing circuitry of the security server, the second digital certificate to the networked device associated with the secure component, the networked device being configured to generate a device commissioning request based on the second digital certificate and the private key of the secure component.

2. The method of claim 1, wherein the second digital certificate includes a device attestation certificate and a product attestation intermediate certificate.

3. The method of claim 1, further comprising authenticating the public key of the secure component based on authentication data received from a second user device.

4. The method of claim 1, further comprising receiving ownership data associated with the secure component prior to generating the second digital certificate.

5. The method of claim 1, further comprising receiving a request for the second digital certificate prior to generating the second digital certificate.

6. The method of claim 1, further comprising receiving a digital signature of the second digital certificate from a certificate authority.

7. A device comprising:

processing circuitry configured to receive a first digital certificate of a secure component, the secure component being associated with a networked device, extract a public key from the first digital certificate, the public key and a corresponding private key being stored in the secure component for asymmetric cryptography, receive a product identifier and a vendor identifier associated with the secure component from a first user device, receive a device identifier;

verify that the device identifier is associated with the secure component. wherein the product identifier and the device identifier are different;

generate a second digital certificate based on public key from the secure component, the product identifier, and the vendor identifier after receiving the device identifier and verifying that the device identifier is associated with the secure component, and transmit the second digital certificate to the networked device associated with the secure component, the networked device being configured to generate a device commissioning request based on the second digital certificate and the private key of the secure component.

8. The device of claim 7, wherein the second digital certificate includes a device attestation certificate and a product attestation intermediate certificate.

9. The device of claim 7, wherein the processing circuitry is configured to authenticate the public key of the secure component based on authentication data received from a second user device.

10. The device of claim 7, wherein the processing circuitry is configured to receive ownership data associated with the secure component prior to generating the second digital certificate.

11. The device of claim 7, wherein the processing circuitry is configured to receive a request for the second digital certificate prior to generating the second digital certificate.

12. The device of claim 7, wherein the processing circuitry is configured to receive a digital signature of the second digital certificate from a certificate authority.

13. A non-transitory computer-readable storage medium for storing computer-readable instructions that, when executed by a computer, cause the computer to perform a method, the method comprising:

receiving a first digital certificate of a secure component, the secure component being associated with a networked device;

extracting a public key from the first digital certificate, the public key and a corresponding private key being stored in the secure component for asymmetric cryptography;

receiving a product identifier and a vendor identifier associated with the secure component from a first user device;

receiving a device identifier;

verifying that the device identifier is associated with the secure component, wherein the product identifier and the device identifier are different;

generating a second digital certificate based on the public key of the secure component, the product identifier, and the vendor identifier after receiving the device identifier and verifying that the device identifier is associated with the secure component; and transmitting the second digital certificate to the networked device associated with the secure component, the networked device being configured to generate a device commissioning request based on the second digital certificate and the private key of the secure component.

14. The non-transitory computer-readable storage medium of claim 13, wherein the second digital certificate includes a device attestation certificate and a product attestation intermediate certificate.

15. The non-transitory computer-readable storage medium of claim 13, wherein the method further comprises authenticating the public key of the secure component based on authentication data received from a second user device.

16. The non-transitory computer-readable storage medium of claim 13, wherein the method further comprises receiving a request for the second digital certificate prior to generating the second digital certificate.

17. The non-transitory computer-readable storage medium of claim 13, wherein the method further comprises receiving a digital signature of the second digital certificate from a certificate authority.

* * * * *